(12) United States Patent
Gates, III et al.

(10) Patent No.: US 8,014,308 B2
(45) Date of Patent: Sep. 6, 2011

(54) HARDWARE ARCHITECTURE FOR CLOUD SERVICES

(75) Inventors: William H. Gates, III, Medina, WA (US); Gary W. Flake, Bellevue, WA (US); William J. Bolosky, Issaquah, WA (US); Nishant V. Dani, Redmond, WA (US); Daniel S. Glasser, Mercer Island, WA (US); Alexander G. Gounares, Kirkland, WA (US); James R. Larus, Mercer Island, WA (US); Matthew B. MacLaurin, Woodinville, WA (US); Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 11/536,534

(22) Filed: Sep. 28, 2006

(65) Prior Publication Data
US 2008/0080552 A1    Apr. 3, 2008

(51) Int. Cl.
*H04L 12/26* (2006.01)
(52) U.S. Cl. ....................................................... 370/252
(58) Field of Classification Search .................. 370/468, 370/252, 255; 709/226
See application file for complete search history.

(56) References Cited

U.S. PATENT DOCUMENTS

| | | | |
|---|---|---|---|
| 5,263,165 A | | 11/1993 | Janis |
| 5,495,576 A | | 2/1996 | Ritchey |
| 5,537,404 A | | 7/1996 | Bentlet et al. |
| 5,588,914 A | | 12/1996 | Adamczyk |
| 5,633,861 A | * | 5/1997 | Hanson et al. ................ 370/232 |
| 5,859,972 A | | 1/1999 | Subramaniam et al. |
| 5,966,705 A | * | 10/1999 | Koneru et al. ................... 707/9 |
| 6,064,656 A | | 5/2000 | Angal et al. |
| 6,067,545 A | | 5/2000 | Wolff |
| 6,185,567 B1 | | 2/2001 | Ratnaraj et al. |
| 6,195,683 B1 | | 2/2001 | Palmer et al. |
| 6,209,039 B1 | | 3/2001 | Albright et al. |

(Continued)

FOREIGN PATENT DOCUMENTS

EP    0915595 A2    5/1999

(Continued)

OTHER PUBLICATIONS

International Search Report and Written Opinion for PCT Patent Application PCT/US2007/079610, completed Nov. 14, 2008 and mailed Nov. 18, 2008, 13 pages.

(Continued)

*Primary Examiner* — Derrick W Ferris
*Assistant Examiner* — Mang Yeung
(74) *Attorney, Agent, or Firm* — Lee & Hayes, PLLC

(57) ABSTRACT

The claimed subject matter provides systems and/or methods that facilitate dynamically allocating resources (e.g., hardware, software, . . . ) supported by a third party service provider. The third party service provider can support any number of services that can be concurrently requested by several clients without user perception of degraded computing performance as compared to conventional systems/techniques due to improved connectivity and mitigated latencies. An interface component can receive a request from a client device. Further, a dynamic allocation component can apportion resources (e.g., hardware resources) supported by the third party service provider to process and respond to the request based at least in part upon subscription data. Moreover, a user state evaluator can determine a state associated with a user and/or the client device; the state can be utilized by the dynamic allocation component to tailor resource allocation.

20 Claims, 12 Drawing Sheets

U.S. PATENT DOCUMENTS

| | | | |
|---|---|---|---|
| 6,226,260 | B1 | 5/2001 | McDysan |
| 6,304,906 | B1 * | 10/2001 | Bhatti et al. ............... 709/227 |
| 6,336,116 | B1 * | 1/2002 | Brown et al. ............... 707/10 |
| 6,341,127 | B1 | 1/2002 | Katsube et al. |
| 6,349,289 | B1 * | 2/2002 | Peterson et al. ............. 705/34 |
| 6,349,297 | B1 * | 2/2002 | Shaw et al. .................. 707/4 |
| 6,409,599 | B1 | 6/2002 | Sprout et al. |
| 6,415,288 | B1 | 7/2002 | Gebauer |
| 6,434,532 | B2 | 8/2002 | Goldband et al. |
| 6,469,991 | B1 | 10/2002 | Chuah |
| 6,496,482 | B1 | 12/2002 | Kubota |
| 6,603,770 | B2 * | 8/2003 | Lin et al. ..................... 370/401 |
| 6,620,043 | B1 | 9/2003 | Haseltine et al. |
| 6,658,540 | B1 * | 12/2003 | Sicola et al. ................ 711/162 |
| 6,671,818 | B1 * | 12/2003 | Mikurak ....................... 714/4 |
| 6,707,820 | B1 | 3/2004 | Arndt et al. |
| 6,745,224 | B1 | 6/2004 | D'Souza et al. |
| 6,763,519 | B1 * | 7/2004 | McColl et al. ............... 718/100 |
| 6,816,905 | B1 | 11/2004 | Sheets et al. |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,020,654 | B1 | 3/2006 | Najmi |
| 7,055,171 | B1 * | 5/2006 | Martin et al. ................. 726/3 |
| 7,065,041 | B2 | 6/2006 | Sen |
| 7,117,499 | B2 * | 10/2006 | Kawamoto et al. ........... 718/105 |
| 7,360,034 | B1 | 4/2008 | Muhlestein et al. |
| 7,373,377 | B2 | 5/2008 | Altieri |
| 2002/0107962 | A1 * | 8/2002 | Richter et al. ............... 709/225 |
| 2002/0124053 | A1 | 9/2002 | Adams et al. |
| 2003/0074394 | A1 * | 4/2003 | Eshghi ....................... 709/203 |
| 2003/0097461 | A1 * | 5/2003 | Barham et al. ............... 709/235 |
| 2003/0105734 | A1 | 6/2003 | Hitchen et al. |
| 2003/0191810 | A1 | 10/2003 | Muhlestein et al. |
| 2003/0195942 | A1 | 10/2003 | Muhlestein et al. |
| 2003/0229623 | A1 | 12/2003 | Chang et al. |
| 2004/0049537 | A1 | 3/2004 | Titmuss |
| 2004/0076160 | A1 | 4/2004 | Phaltankar |
| 2004/0098456 | A1 | 5/2004 | Krzyzanowski et al. |
| 2005/0013316 | A1 * | 1/2005 | Liao et al. .................... 370/449 |
| 2005/0021939 | A1 * | 1/2005 | Le et al. ....................... 713/153 |
| 2005/0033669 | A1 | 2/2005 | Stremler et al. |
| 2005/0128971 | A1 * | 6/2005 | Huschke et al. ............. 370/328 |
| 2005/0138419 | A1 | 6/2005 | Gupta et al. |
| 2005/0147035 | A1 * | 7/2005 | Sylvain et al. ............... 370/230 |
| 2005/0193306 | A1 | 9/2005 | Luff et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2006/0277307 | A1 | 12/2006 | Bernardin et al. |
| 2007/0115123 | A1 | 5/2007 | Roberts et al. |
| 2007/0136572 | A1 | 6/2007 | Chen et al. |
| 2008/0008304 | A1 * | 1/2008 | Deutsch et al. .......... 379/201.01 |
| 2008/0083040 | A1 | 4/2008 | Dani et al. |
| 2008/0189774 | A1 | 8/2008 | Ansari et al. |
| 2008/0215450 | A1 | 9/2008 | Gates et al. |
| 2008/0215603 | A1 | 9/2008 | Mishra et al. |

FOREIGN PATENT DOCUMENTS

| | | | |
|---|---|---|---|
| EP | 1058429 | A1 | 12/2000 |
| EP | 1376309 | | 1/2004 |
| EP | 1524580 | A2 | 4/2005 |
| EP | 1564622 | | 8/2005 |
| JP | 2001282634 | A | 10/2001 |
| KR | 1020040038271 | A | 5/2004 |
| KR | 1020040107152 | A1 | 12/2004 |
| KR | 1020060057563 | A1 | 5/2006 |
| WO | WO 0008814 | A1 | 2/2000 |
| WO | WO 04002107 | A1 | 12/2003 |
| WO | 2005022826 | | 10/2006 |

OTHER PUBLICATIONS

International Search Report for PCT Application No. US2007/079598 dated Jan. 30, 2008, 10 pages.

International Search Report for PCT Application No. US2007/079606 dated Feb. 27, 2008, 10 pages.

OA Dated Jan. 26, 2009 for U.S. Appl. No. 11/536,449, 34 pages.

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004. pp. 1-137.

James Surowiecki. The Wisdom of Crowds. Doubleday, 2004. pp. 138-306.

Sandhu, et al. Access Control: Principles and Practice. IEEE Commmunications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf&identifier=oai:arXiv.org:cs/0502091. Last accessed Sep. 20, 2006.

Boss, et al., "Cloud Computing", <<http://download.boulder.ibm.com/ibmdl/pub/software/dw/wes/hipods/Cloud_computing_wp_final_8Oct.pdf>>. Last accessed on Nov. 27, 2008, 17 pages.

Duffield, et al., "Resource Management with Hoses: Point-to-Cloud Services for Virtual Private Networks" <<http://www.research.att.com/~kobus/docs/vpnton.pdf>> Last accessed Nov. 27, 2008, 16 pages.

VMware Announces the Next Generation of Virtualization—the Virtual Datacenter Operating . . . <<http:www.reuters.com/article/pressRelease/idUS96167+15-Sep-2008+BW20080915>>. Last accessed on Nov. 27, 2008, 3 pages.

Wang, et al., "The Cumulus Project: Build a Scientific Cloud for a Data Center", <<http://www.cca08.org/papers/Paper29-Lizhe-Wang.pdf>>. Last accessed on Nov. 27, 2008, 7 pages.

* cited by examiner

HARDWARE ARCHITECTURE FOR CLOUD SERVICES

BACKGROUND

Conventionally, most computational tasks are performed upon a client or a server within a proprietary intranet. For example, a software application resident upon a client can be utilized by the client to effectuate operations such as creating data, obtaining data, manipulating data and/or storing data in memory associated with the client. Further, corporate entities and universities oftentimes employ one or more servers to perform tasks such as data storage/retrieval, data warehousing/analysis, electronic mail and/or backup. These clients and/or servers within the proprietary intranet can include software applications that provide functionality such as network browsing, word processing, electronic mail management, and so forth.

In typical client-server architectures, hardware resources of clients and servers on proprietary intranets are utilized to effectuate the aforementioned computationally intensive tasks. However, client and server hardware resources can be expensive, difficult and time consuming to install, update, troubleshoot and maintain. According to an illustration, upgrading server hardware of corporate entities can lead to lengthy downtimes during which electronic mail communications are halted, employees are unable to access data retained on the servers, customers are unable to view content or effectuate online commercial transactions with the corporate entities, and the like; thus, in addition to costs associated with purchasing the hardware, the corporate entity is faced with lost profits, customer frustration, diminished employee productivity, and so forth.

Moreover, conventional client devices can be constrained by limited storage, processing power, security, bandwidth, redundancy, graphical display rendering capabilities, etc. Upgrading hardware resources associated with client devices can be effectuated by purchasing replacement client devices or components of the client devices that can be installed such as central processing units (CPUs), random access memory (RAM), hard disks, video display controllers, and the like; however, upgraded client devices can still be constrained by the above-noted limitations. For example, typical cellular telephones or personal digital assistants (PDAs) may be unable to store large libraries of video files in memory of such devices. Thus, desired computational tasks can be omitted due to limitations of hardware resources.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate dynamically allocating resources (e.g., hardware, software, . . . ) supported by a third party service provider. The third party service provider can support any number of services that can be concurrently requested by several clients without user perception of degraded computing performance as compared to conventional systems/techniques due to improved connectivity and mitigated latencies. An interface component can receive a request from a client device. Further, a dynamic allocation component can apportion resources (e.g. hardware resources) supported by the third party service provider to process and respond to the request based at least in part upon subscription data. Moreover, a user state evaluator can determine a state associated with a user and/or the client device; the state can be utilized by the dynamic allocation component to tailor resource allocation.

In accordance with various aspects of the claimed subject matter, hardware resources (e.g., related to processing, storage, connectivity, caching, . . . ) supported by a third party service provider can be allocated dynamically, for example, based upon subscription related data. Additionally or alternatively, resources can be allotted as a function of time based upon user need, user frustration, number of requests, identity of requesting users, subscriptions associated with requesting users, type of resources requested, time of day, geographic location, cost/benefit analysis, client device capabilities, and the like. Resources hosted by the third party service provider can be leveraged to mitigate constraints such as hardware limitations (e.g. limited storage, processing power, bandwidth, connectivity, . . . ), expensive and time-consuming maintenance and upgrading, and the like, which can be typically associated with client-side devices and/or servers within proprietary intranets.

Pursuant to one or more aspects of the claimed subject matter, an amount of memory allotted for a particular user can be dependent upon the user's subscription. According to a further example, a user may purchase a number of central processing unit (CPU) cycles hosted by the third party service provider, and the CPU cycles can be employed in connection with processing request(s). Also, redundancy can be allocated based upon a subscription, and thus, hardware resource utilization can be accordingly apportioned; thus, a subscription can enable persistently storing copies of a subscriber's data in memory of data store(s) supported by the third party service provider. Moreover, alternative communication paths (e.g. between a client and the third party service provider, between disparate third party service providers, . . . ) can be allocated based on a subscription for utilization upon failure of a primary communication path.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
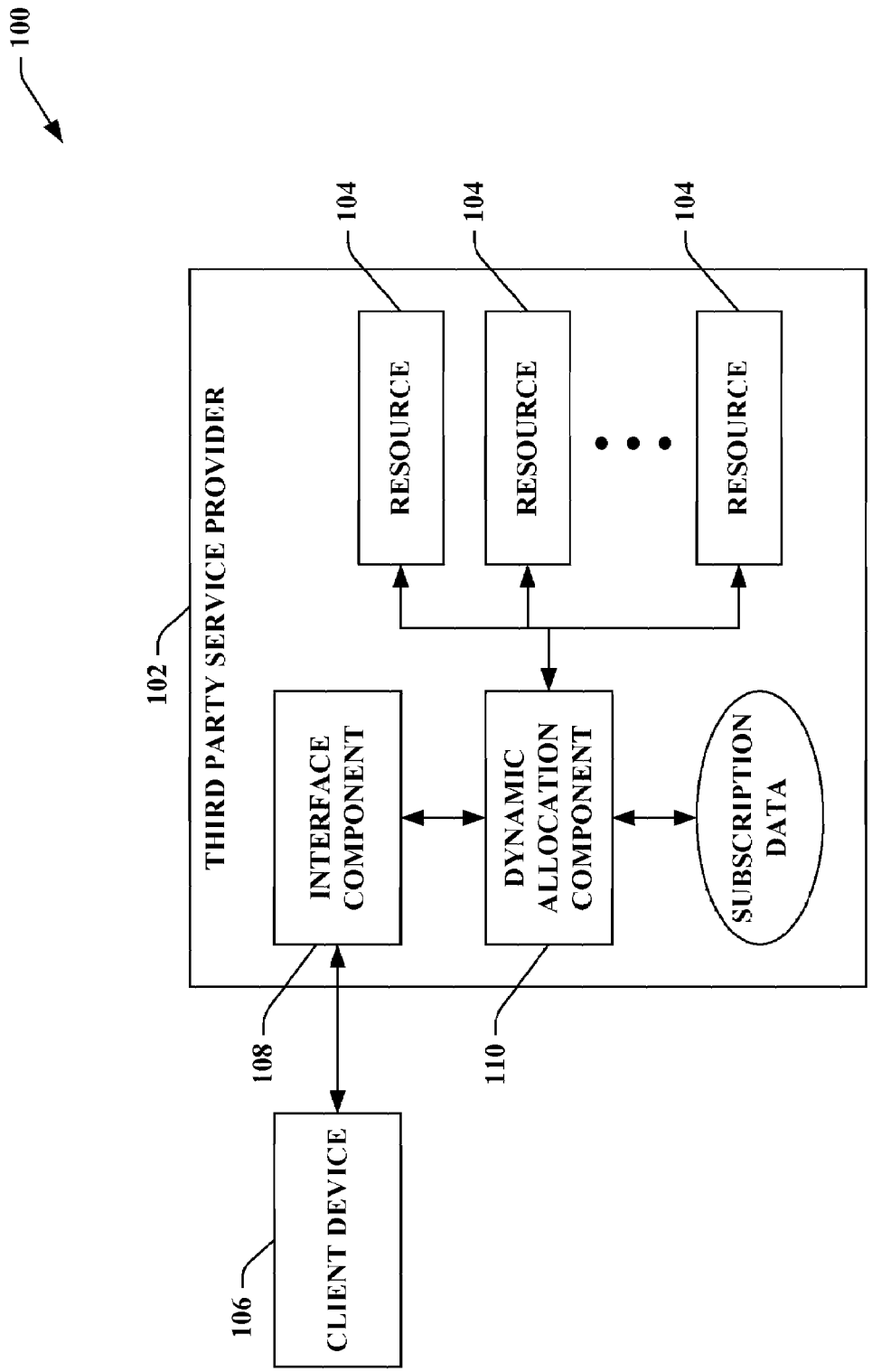
FIG. 1 illustrates a block diagram of an exemplary system that facilitates adjusting utilization and/or allocation of hardware resource(s) to remote clients.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates adjusting utilization and/or allocation of hardware resource(s) to remote clients. The system 100 includes a third party service provider 102 that can concurrently service requests from several clients without user perception of degraded computing performance as compared to conventional techniques where computational tasks can be performed upon a client or a server within a proprietary intranet. The third party service provider 102 (e.g., "cloud") supports a collection of hardware and/or software resources 104. The hardware and/or software resources 104 can be maintained by an off-premises party, and the resources 104 can be accessed and utilized by identified users over a network (e.g., Internet, WAN, . . . ). Resources 104 provided by the third party service provider 102 can be centrally located and/or distributed at various geographic locations. For example, the third party service provider 102 can include any number of data center machines that provide resources 104. The data center machines can be utilized for storing/retrieving data, effectuating computational tasks, rendering graphical outputs, routing data, and so forth.

According to an illustration, the third party service provider 102 can provide any number of resources 104 such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider 102 is contemplated. According to an illustration, disparate third party service providers can be maintained by differing off-premise parties and a user can employ (e.g. concurrently, at different times, . . . ) all or a subset of the third party service providers.

By leveraging resources 104 supported by the third party service provider 102, limitations commonly encountered with respect to hardware associated with clients and servers within proprietary intranets can be mitigated. Off-premises parties, instead of users of clients or network administrators of servers within proprietary intranets, can maintain, troubleshoot, replace and update the hardware resources 104. Further, for example, lengthy downtimes can be mitigated by the third party service provider 102 utilizing redundant resources 104; thus, if a subset of the resources 104 are being updated or replaced, the remainder of the resources 104 can be utilized to service requests from users. According to this example, the resources 104 can be modular in nature, and thus, resources 104 can be added, removed, tested, modified, etc. while the remainder of the resources 104 can support servicing user requests. Moreover, hardware resources 104 supported by the third party service provider 102 can encounter fewer constraints with respect to storage, processing power, security, bandwidth, redundancy, graphical display rendering capabilities, etc. as compared to conventional hardware associated with clients and servers within proprietary intranets.

The system 100 can include a client device 106 that employs resources 104 of the third party service provider 102. Although one client device 106 is depicted, it is to be appreciated that the system 100 can include any number of client devices similar to the client device 106, and the plurality of client devices can concurrently utilize supported resources 104. By way of illustration, the client device 106 can be a desktop device (e.g., personal computer), portable device (e.g., laptop, tablet, handheld such as a personal digital assistant (PDA), portable music player, portable gaming device, . . . ), mobile phone, home media center, and the like. Further, the client device 106 can be an embedded system that can be physically limited, and hence, it can be beneficial to leverage resources 104 of the third party service provider 102; for example, the embedded system can be included in a car, a global positioning system (GPS) navigation system, an intelligent agricultural watering system, buoy sensors in the ocean, a household appliance, medical equipment, industrial machinery, and so forth. According to another example, the client device 106 can be associated with surface(s) (e.g., walls that can be interactive screens within buildings such as houses, offices, retail establishments, . . . ) that can interact with user(s) (e.g., by displaying data and/or obtaining user input, . . . ). The client device 106 can be a thin client utilized to access services hosted by the third party service provider 102 with minimal latency. Further, the client device 106 can interact with a user (e.g., receive user input, output content from the third party service provider 102, . . . ).

Resources 104 can be shared amongst a plurality of client devices subscribing to the third party service provider 102 (however, it is contemplated that the claimed subject matter is not limited to allocating resources 104 based upon subscriptions). According to an illustration, one of the resources 104 can be at least one central processing unit (CPU), where CPU cycles can be employed to effectuate computational tasks requested by the client device 106. Pursuant to this illustration, the client device 106 can be allocated a subset of an overall total number of CPU cycles, while the remainder of the CPU cycles can be allocated to disparate client device(s). Additionally or alternatively, the subset of the overall total number of CPU cycles allocated to the client device 106 can vary over time. Further, a number of CPU cycles can be purchased by the user of the client device 106. In accordance with another example, the resources 104 can include data store(s) that can be employed by the client device 106 to retain data. The user employing the client device 106 can have access to a portion of the data store(s) supported by the third party service provider 102, while access can be denied to remaining portions of the data store(s) (e.g., the data store(s) can selectively mask memory based upon user/device identity, permissions, . . . ). It is contemplated that any additional types of resources 104 can likewise be shared.

The third party service provider 102 can further include an interface component 108 that can receive input(s) from the client device 106 and/or enable transferring a response to such input(s) to the client device 106 (as well as perform similar communications with any disparate client devices). According to an example, the input(s) can be request(s), data, executable program(s), etc. For instance, request(s) from the client device 106 can relate to effectuating a computational task, storing/retrieving data, rendering a user interface, and the like via employing one or more resources 104. Further, the interface component 108 can obtain and/or transmit data over a network connection. According to an illustration, executable code can be received and/or sent by the interface component 108 over the network connection. Pursuant to another example, a user (e.g. employing the client device 106) can issue commands via the interface component 108 (e.g., "run this application", "delete this file", . . . ).

Moreover, the third party service provider 102 includes a dynamic allocation component 110 that apportions resources 104 (e.g., hardware resource(s)) supported by the third party service provider 102 to process and respond to the input(s) (e.g., request(s), data, executable program(s), . . . ) obtained from the client device 106. The dynamic allocation component 110 can allot resources 104 based upon subscription data. Further, the resource allotment provided by the dynamic allocation component 110 can vary as a function of time based on considerations such as needs of users, authorization level, upcoming events (e.g., evinced by calendars, meeting requests, indications of time frames, . . . ), frustrations of users, availability of resources 104, number of requests (e.g., from particular user(s), group(s) of users, all users, . . . ), identity of requesting users, subscriptions associated with requesting users (e.g., subscription level), type of resource(s) 104 requested, time of day, day, geographic location, cost/benefit analysis, client device 106 capabilities, and so forth.

Users can subscribe to utilize resources 104 hosted by the third party service provider 102. According to an illustration, disparate subscription levels can be offered in connection with resources 104 of the third party service provider 102. For instance, a higher level subscription can provide increased processing power, bandwidth, storage capacity, services, and so forth as compared to a lower level subscription. Pursuant to a further example, each subscription level can provide a corresponding minimum level of resource assignment by the dynamic allocation component 110; however, if fewer requests by subscribers with high level subscriptions are obtained at a particular time, the dynamic allocation component 110 can alter the resource assignment above the minimum level. Further, subscriptions can be obtained for individual users and/or groups of users. Thus, corporate entities can purchase subscriptions that can be utilized by their respective employees.

Subscription data (e.g., that can be retained by the third party service provider 102, included and/or altered with input(s) from the client device 106, . . . ) can be utilized to distribute the resources 104. For instance, an amount and/or type of memory allotted for a particular user can be dependent upon the user's subscription data. Moreover, a user may purchase a number of CPU cycles associated with a data center machine, which can be employed in connection with processing input(s). Also, redundancy can be allocated based upon subscription data, and thus, hardware resource utilization can be accordingly apportioned; therefore, a subscription can provide for persistently storing copies of a subscriber's data in memory of more than one data center machine. Moreover, the dynamic allocation component 110 can allocate alternative communication paths (e.g., between the client device 106 and the interface 108 of the third party service provider 102, between the third party service provider 102 and disparate third party service provider(s), . . . ) based upon subscription data (e.g., upon failure of a primary communication path). Further, resources such as, for instance, communication bandwidth, security levels, archival length, etc. can be allotted by the dynamic allocation component 110. It is to be appreciated, however, that the claimed subject matter is not limited to the aforementioned examples.

According to another example, subscriptions need not be utilized in connection with allocating resources 104 of the third party service provider 102. Pursuant to this example, resources 104 can be allotted by the dynamic allocation component 110 in association with advertising. Thus, advertisements can be generated, stored, provided by, etc. the third party service provider 102 (e.g., via employing apportioned resources 104) to the client device 106, while the client device 106 (and/or the user) need not have a subscription. In accordance with an example, the dynamic allocation component 110 can enable providing targeted advertising by tailoring resources 104 utilized for yielding advertisements for disparate users based upon considerations such as transaction history, user attentional status, user schedule, location, and so forth.

Pursuant to a further example, users can employ resources 104 of the third party service provider 102 anonymously and/or on a pay-as-you go basis. For instance, a user can pay a one time fee to convert a library of .wma files into .mp3files without revealing her identity and without subscribing to the third party service provider 102.

Although the interface component 108 is depicted as being separate from the dynamic allocation component 110, it is contemplated that the dynamic allocation component 110 can include the interface component 108 or a portion thereof Also, the interface component 108 can provide various adaptors, connectors, channels, communication paths, etc. to enable interaction with the dynamic allocation component 110.

Figure 2:
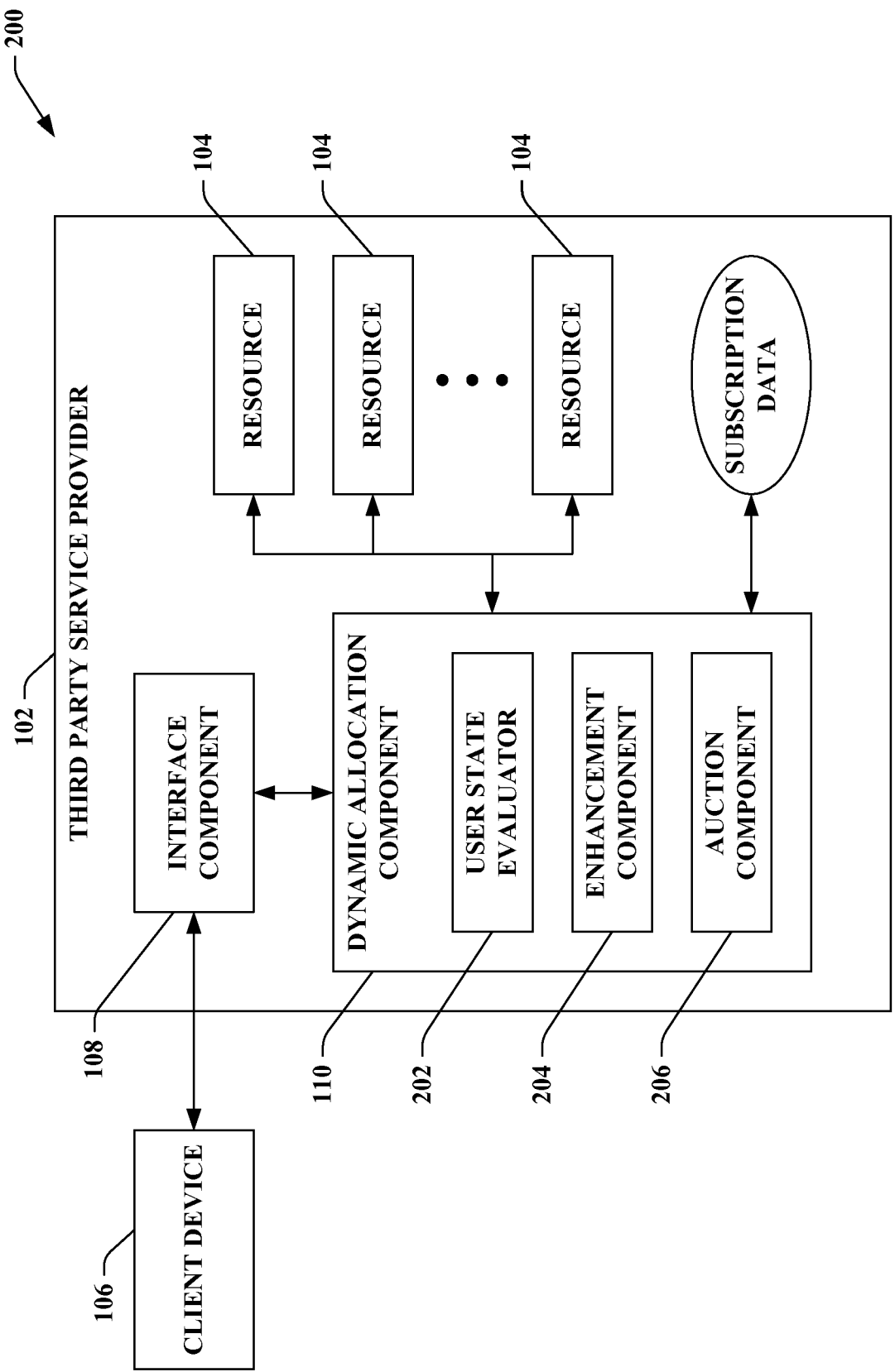
FIG. 2 illustrates a block diagram of an exemplary system that apportions resource(s) based upon considerations of user state.

With reference to FIG. 2, illustrated is a system 200 that apportions resource(s) based upon considerations of user state. The system 200 includes the third party service provider 102 that supports any number of resources 104 (e.g., hardware, software, firmware, . . . ) that can be employed by the client device 106 (and/or disparate client device(s) (not shown)). The third party service provider 102 further comprises the interface component 108 that receives resource utilization requests (e.g., requests to effectuate operations utilizing resources 104 supported by the third party service provider 102) from the client device 106 and the dynamic allocation component 110 that partitions resources 104 (e.g., between users, devices, computational tasks, . . . ). Moreover, the dynamic allocation component 110 can further include a user state evaluator 202, an enhancement component 204 and an auction component 206.

The user state evaluator 202 can determine a state associated with a user and/or the client device 106 employed by the user, where the state can relate to a set of properties such as behaviors, frustrations, needs, configurations, attributes, conditions, preferences, contexts, information content, authorization levels, capabilities, and/or roles. For instance, the user state evaluator 202 can analyze explicit and/or implicit information obtained from the client device 106 (e.g., via the interface component 108) and/or retrieved from memory associated with the third party service provider 102 (e.g., preferences indicated in subscription data). State related data yielded by the user state evaluator 202 can be utilized by the dynamic allocation component 110 to tailor the apportionment of resources 104.

By way of example, the user state evaluator 202 can determine user frustration. According to this example, the user state evaluator 202 can infer frustration from delays, failures, errors, and the like associated with requests from the client device 106 to employ resources 104. Further, the user state evaluator 202 can analyze variations in frequency of user input (e.g., user repeatedly providing the same input such as depressing a key on a keyboard or a mouse button with a high frequency prior to obtaining a response to the input), tone of input (e.g. intonation in user speech evaluated with speech recognition), physical movements and/or actions (e.g., sensor in a screen that detects when users hit the screen from frustration), facial expressions, and so forth to deduce user frustration. Additionally or alternatively, the client device 106 can obtain explicit user input related to his or her frustration level (e.g., user can select a button that indicates she is frustrated with performance of a requested service supported by the third party service provider 102, . . . ). As a level of frustration of the user increases as determined by the user state evaluator 202, the dynamic allocation component 110 can provide the user with an increased share of resources 104, and the share can be reduced as the analyzed frustration level diminishes.

According to another illustration, the user state evaluator 202 can consider characteristics of the client device 106, which can be used to apportion resources 104 by the dynamic allocation component 110. For instance, the user state evaluator 202 can identify that the client device 106 is a cellular telephone with limited display area. Thus, the dynamic allocation component 110 can employ this information to reduce resources 104 utilized to render an image upon the client device 106 since the cellular telephone may be unable to display a rich graphical user interface. Further, the user state evaluator 202 can perform a cost/benefit analysis based upon characteristics of the client device 106. For example, if minimal benefit is derived from increasing an allocation of resources 104 to the client device 106 (e.g., due to limited processing power, display real estate, bandwidth, memory, and so forth of the client device 106) while increasing costs (e.g., opportunity costs associated with not allotting such resources 104 to disparate client devices, computational tasks, and the like), then the user state evaluator 202 can provide an output to the dynamic allocation component 110 that enables limiting share(s) of resources 104 related to client devices unable to fully utilize such resources 104.

Other examples of information that the user state evaluator 202 can evaluate include a number of concurrent requests from the client device 106, corporate hierarchy (e.g., provide a corporate CEO with more resources as compared to a new employee when both individuals utilize a common subscription, . . . ), and characteristics of computational tasks (e.g., importance of the tasks, upcoming deadlines/events by which the tasks are needed, . . . ). For instance, the client device 106 can be utilized to download a video file for persistent storage upon the client device 106. The client device 106 can be employed to indicate an expected viewing time for the video file (and/or a time by which the download is desired to be completed); thus, if the video is to be viewed within thirty minutes, more bandwidth can be allocated as compared to when the video is expected to be viewed in two days. Pursuant to this example, differential billing can be utilized to charge more for a quicker download. It is to be appreciated that the user state evaluator 202 can additionally or alternatively consider any disparate types of information to effectuate state analysis.

Moreover, the enhancement component 204 can facilitate increasing an allocation of resources 104 for a particular user and/or client device 106. For instance, the enhancement component 204 can receive explicit input to increase the amount and/or alter the type of resources utilized with the client device 106 (e.g. Supersize Me!). According to an example, an icon can be displayed as part of a graphical user interface rendered upon the client device 106, and selection of the icon can increase (e.g., temporarily, permanently, . . . ) resources 104 assigned to the client device 106. Pursuant to this example, additional monetary charges in addition to subscription costs can be applied to the user's account. Additionally or alternatively, subscriptions can include a preset number of opportunities to dynamically increase allocation of resources 104.

Further, the auction component 206 can enable users to auction unutilized resources 104. For instance, if a user (temporarily) utilizes less than all the resources 104 he is entitled to (e.g., according to the subscription data, as distributed by the dynamic allocation component 110, . . . ), that user can offer them to other users that need additional resources 104. Thus, unutilized resources 104 can be sold, bartered, donated, traded, exchanged, auctioned, etc. to disparate users. According to an example, the unutilized resources 104 can be dynamically priced. For instance, pricing of the resources 104 can vary over time based upon supply of available resources 104 (e.g., amount of resources 104 for sale, auction, trade, or the like by a plurality of users) and/or demand for the available resources 104. Moreover, depending upon a subscription level, unutilized resources 104 offered for transfer with a higher level subscription can be priced higher as compared to unutilized resources 104 associated with a lower level subscription. Upon a disparate user obtaining the resources 104 (e.g., by way of purchase, auction, trade, . . . ), the dynamic allocation component 110 can apportion these newly obtained resources 104 to the disparate user. Further, a market (e.g., stock market) can be built upon the transfer of the resources 104; thus, options, hedge bets, and the like can be traded based upon this market.

The auction component 206 can obtain user input indicating a user's resources 104 to offer to disparate users. Thus, the user can designate a subset or all of the resources 104 (to which he is entitled) to be offered for transfer via the auction component 206. According to another example, the auction component 206 can automatically offer resources 104 to disparate users. For instance, if unused resources 104 are set to expire at an upcoming time, the auction component 206 can automatically offer to sell, trade, auction, etc. these resources (and/or provide a suggestion to the user to offer the unused resources). Moreover, the auction component 206 can evaluate historical trends associated with resource 104 utilization to determine whether the user has an excess amount of allocated resources, and thereafter offer or suggest to offer the resources 104 (or a portion of the resources 104) to disparate users. According to another example, the auction component 206 can evaluate that a first user is not utilizing a portion or all of his apportioned resources 104, while a second user needs additional resources 104; thus, the auction component 206 can automatically broker a trade of resources 104 between the users. For instance, the auction component 206 can trade resources 104 to be utilized within a short time frame for resources 104 to be employed at a later time. Additionally or alternatively, the auction component 206 can trade a first type of resource 104 for a second type of resource 104 (e.g., trade bandwidth for CPU cycles). In accordance with another example, the auction component 206 can enable selling resources 104 back to the third party service provider 102 (e.g., in return for a refund of a portion of a subscription fee, . . . ).

Pursuant to a further example, the auction component 206 can enable a buyer to indicate an interest in purchasing resources 104. Thus, the buyer can employ the auction component 206 to provide information related to desired resources 104 (e.g., type of resource 104, time for resource 104 utilization, desired resource 104 amount, . . . ). According to this example, the auction component 206 can enable a user with unused resources 104 to sell, trade, barter, etc. the resources 104 to the buyer (e.g., by accepting the offer, counter offering, . . . ). In accordance with a further example, the auction component 206 can effectuate an auction whereby sellers bid for a price at which they will sell the resources 104 to buyers. Moreover, the auction component 206 can enable negotiating between parties involved in potential transactions related to resources 104 (e.g. provide a forum in which the parties can provide counteroffers to each other). Additionally, the auction component 206 can determine a fair market price for resources 104 involved in a transfer (e.g., based upon historical transaction data, supply of resources 104 being offered by a plurality of users, demand for resources 104, . . . ); thus, a buyer and a seller can agree to an exchange and the auction component 206 can set the price. However, it is to be appreciated that the claimed subject matter is not limited to the aforementioned examples.

Figure 3:
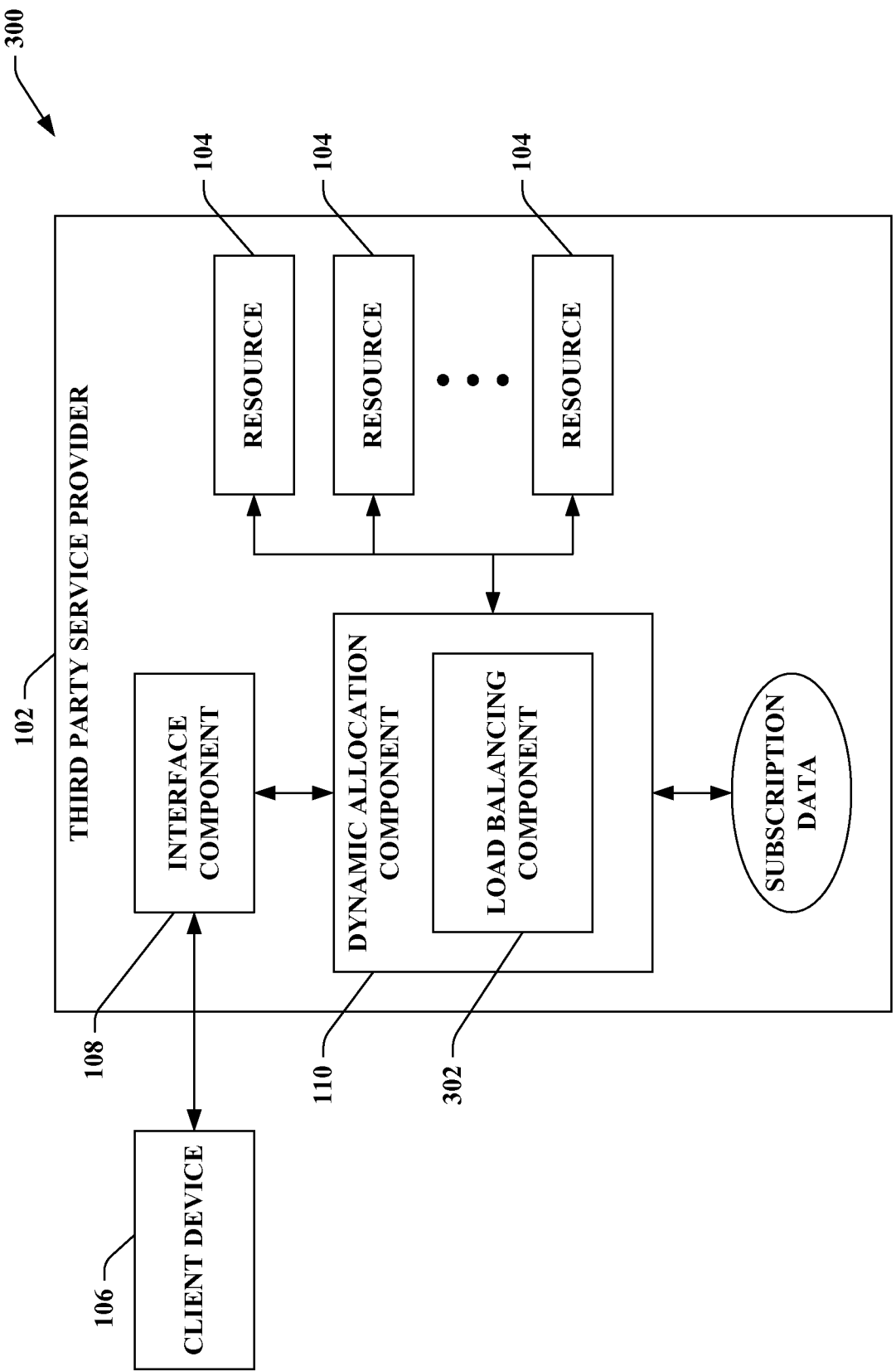
FIG. 3 illustrates a block diagram of an exemplary system that employs load balancing to optimize utilization of resources.

Referring to FIG. 3, illustrated is a system 300 that employs load balancing to optimize utilization of resources 104. The system 300 includes the third party service provider 102 that communicates with the client device 106 (and/or any disparate client device(s) and/or disparate third party service provider(s)). The third party service provider 102 can include the interface component 108 that transmits and/or receives data from the client device 106 and the dynamic allocation component 110 that allots resources 104 (e.g., provides shared access to hardware resources 104 to the client device 106 based at least in part upon subscription data). The dynamic allocation component 110 can further comprise a load balancing component 302 that optimizes utilization of resources 104. By employing the load balancing component 302, overall capacity associated with the third party service provider 102 can be increased. Pursuant to an example, the load balancing component 302 can dynamically adjust prices of resources 104 based upon global demand. In accordance with this example, a long running job (e.g., compressing a video stream, . . . ) can be scheduled to "steal" cycles when demand is low; thus, leftover resources 104 during times of lower demand can be allocated by the load balancing component 302.

According to an example, the load balancing component 302 can yield an output that enables the dynamic allocation component 110 to allocate resources 104 based on geographic location and/or time of day associated with the geographic location. Pursuant to this example, the load balancing component 302 can enable assigning increased percentages of overall resources 104 to client device(s) in a geographic location during typical business hours and decreased percentages at nighttime. For instance, at 9:00 AM EST (6:00 AM PST), the load balancing component 302 can determine to allocate more bandwidth (e.g., resource 104) to client device(s) located in New York versus client device(s) positioned in California.

In accordance with another illustration, the third party service provider 102 can enable enterprises to work with multiple offices and thereby allow for forming virtual enterprises. With virtual enterprises, people need not be physically located in particular locations, yet can have full access to resources 104. Further, members associated with the virtual enterprises (e.g., employees, . . . ) can utilize a common subscription associated with the enterprise and/or any number of disparate subscriptions. A subscription for a group of users at various locations (e.g. members associated with virtual enterprises) can provide a minimum level of resources 104 for the group while the load balancing component 302 can optimize allotment of resources 104 between the group members (e.g., shift shared resources 104 between group members utilizing a common subscription).

Moreover, the load balancing component 302 can monitor resources 104 of the third party service provider 102 to detect failures. If a subset of the resources 104 fails, the load balancing component 302 can continue to optimize the remaining resources 104. Thus, if a portion of the total number of processors fails, the load balancing component 302 can enable redistributing cycles associated with the non-failing processors.

Figure 4:
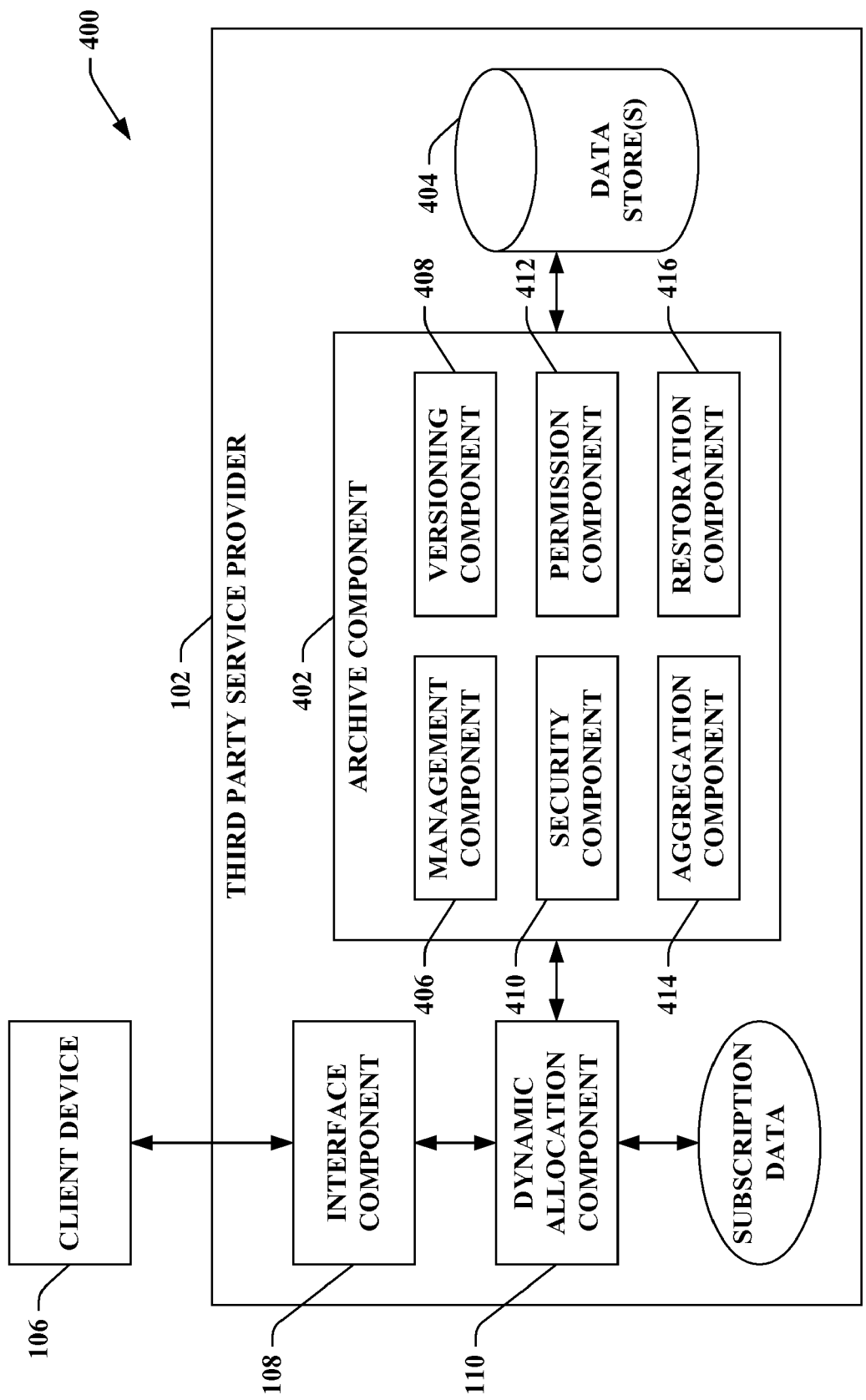
FIG. 4 illustrates a block diagram of an exemplary system that archives and/or analyzes data utilizing a third party service provider.

Now turning to FIG. 4, illustrated is a system 400 that archives and/or analyzes data utilizing the third party service provider 102. The third party service provider 102 can include the interface component 108 that enables communicating with the client device 106. Further, the third party service provider 102 comprises the dynamic allocation component 110 that can apportion data retention resources, for example. Moreover, the third party service provider 102 can include an archive component 402 and any number of data store(s) 404. Access to and/or utilization of the archive component 402 and/or the data store(s) 404 by the client device 106 (and/or any disparate client device(s)) can be controlled by the dynamic allocation component 110. The data store(s) 404 can be centrally located and/or positioned at differing geographic locations. Further, the archive component 404 can include a management component 406, a versioning component 408, a security component 410, a permission component 412, an aggregation component 414, and/or a restoration component 416.

The data store(s) 404 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) 404 of the subject systems and methods is intended to comprise, without being limited to, these and any other suitable types of memory. In addition, it is to be appreciated that the data store(s) 404 can be a server, a database, a hard drive, and the like.

The management component 406 facilitates administering data retained in the data store(s) 404. The management component 406 can enable providing multi-tiered storage within the data store(s) 404, for example. According to this example, unused data can be aged-out to slower disks and important data used more frequently can be moved to faster disks; however, the claimed subject matter is not so limited. Further, the management component 406 can be utilized (e.g. by the client device 106) to organize, annotate, and otherwise reference content without making it local to the client device 106. Pursuant to an illustration, enormous video files can be tagged via utilizing a cell phone. Moreover, the management component 406 enables the client device 106 to bind metadata, which can be local to the client device 106, to file streams (e.g., retained in the data store(s) 404); the management component 406 can enforce and maintain these bindings.

Additionally or alternatively, the management component 406 can allow for sharing data retained in the data store(s) 404 with disparate users and/or client devices. For example, fine-grained sharing can be supported by the management component 406 (e.g. a user can input "share this document with Alex" or "share all appointments with Teresa", . . . ). Also, the management component 406 can mitigate accidental editing of a user's document regardless of a level of permissions; instead, the management component 406 can yield a notification that new version(s) exist, and the user can organize, annotate, or delete those versions independently of other version(s). According to a further example, the management component 406 can provide file synchronization.

Moreover, the management component 406 can enable browsing and/or searching for data retained in the data store(s) 404. A user's data can be heterogeneously distributed in the data store(s) 404. For instance, subsets of the user data can be stored in data store(s) 404 as well as disparate data store(s) hosted by differing off-premises parties. The management component 406 can enable searching and/or browsing the user data without consideration of the physical topology of the storage devices utilized to retain the data. Thus, browsing effectuated with the management component 406 of "all my pictures" allows a user to view all pictures stored upon any data store (e.g. hosted by any number of third party service providers, . . . ).

The management component 406 additionally can enable metadata and content to be treated differently. For instance, asking a question about a 700 Mb movie need not imply that the user desires to copy the movie to her hard drive. Further, looking for a document remotely on a home machine does not mean that the user wants to copy all documents to her office machine. Thus, schedule and policy for synchronization of metadata and for synchronization of file streams can be orthogonal.

The versioning component 408 can enable retaining and/or tracking versions of data. For instance, the versioning component 408 can identify a latest version of a document (regardless of a saved location within data store(s) 404). Additionally, upon saving a document, the versioning component 408 can create a new version of the document and link the versions. Thus, the versioning component 408 can enable retaining data (e.g., all versions of a document) unless an explicit instruction to delete data is obtained (e.g. from the user of the client device 106). Further, the versioning component 408 can facilitate continuously auto-saving data.

The security component 410 limits availability of resources based on user identity and/or authorization level. For example, the security component 410 can protect against unauthorized access and/or use of data retained by the archive component 402. The security component 410 enhances confidentiality, integrity and availability of the archived data. For instance, the security component 410 can encrypt data transferred to the client device 106 and/or decrypt data obtained from the client device 106. Moreover, the security component 410 can certify and/or authenticate data retained by the archive component 402. According to an example, the security component 410 can analyze whether a user can access and/or use data based upon an identity determined from usernames, passwords, personal identification numbers, personal status, management positions, occupation hierarchy, biometric indicia (e.g., voice recognition, fingerprint analysis, retina analysis, . . . ), and the like. Additionally or alternatively, the security component 410 can limit access to other resources; for example, the security component 410 can mitigate an ability of a computation to use unbounded amounts of memory and/or CPU cycles (e.g., denial of service), or run any program (or parts thereof).

The permission component 412 can enable a user to assign arbitrary access permissions to various users, groups of users and/or all users. For instance, the permission component 412 can obtain explicit preferences (e.g., from the client device 106, included with subscription data, . . . ) related to granting of permissions from a user, which can be enforced. Additionally or alternatively, the permissions can be implied and/or inferred by the permission component 412 based upon considerations related to the user's history, permissions set by disparate users, type of content, and so forth.

Further, the aggregation component 414 assembles and/or analyzes collections of data. The aggregation component 414 can seamless incorporate third party data into a particular user's data. Additionally, the aggregation component 414 can combine data from any number of users that employ the third party service component 102 and/or disparate sources (e.g., sensors, cameras, . . . ) and perform data correlation across service platforms and/or applications. According to an example, the aggregation component 414 can track motion of objects monitored with RFID devices (e.g., utilizing RFID with cloud services tags), and an analysis performed upon the motion data by the aggregation component 414 can identify bottlenecks in shipping. Moreover, the aggregation component 414 can effectuate data mining on the collected data. However, the claimed subject matter is not limited to the aforementioned examples.

Moreover, the restoration component 416 rolls back data retained by the archive component 402. For example, the restoration component 416 can continuously record an environment associated with the third party service provider 102. Further, the restoration component 416 can playback the recording.

Figure 5:
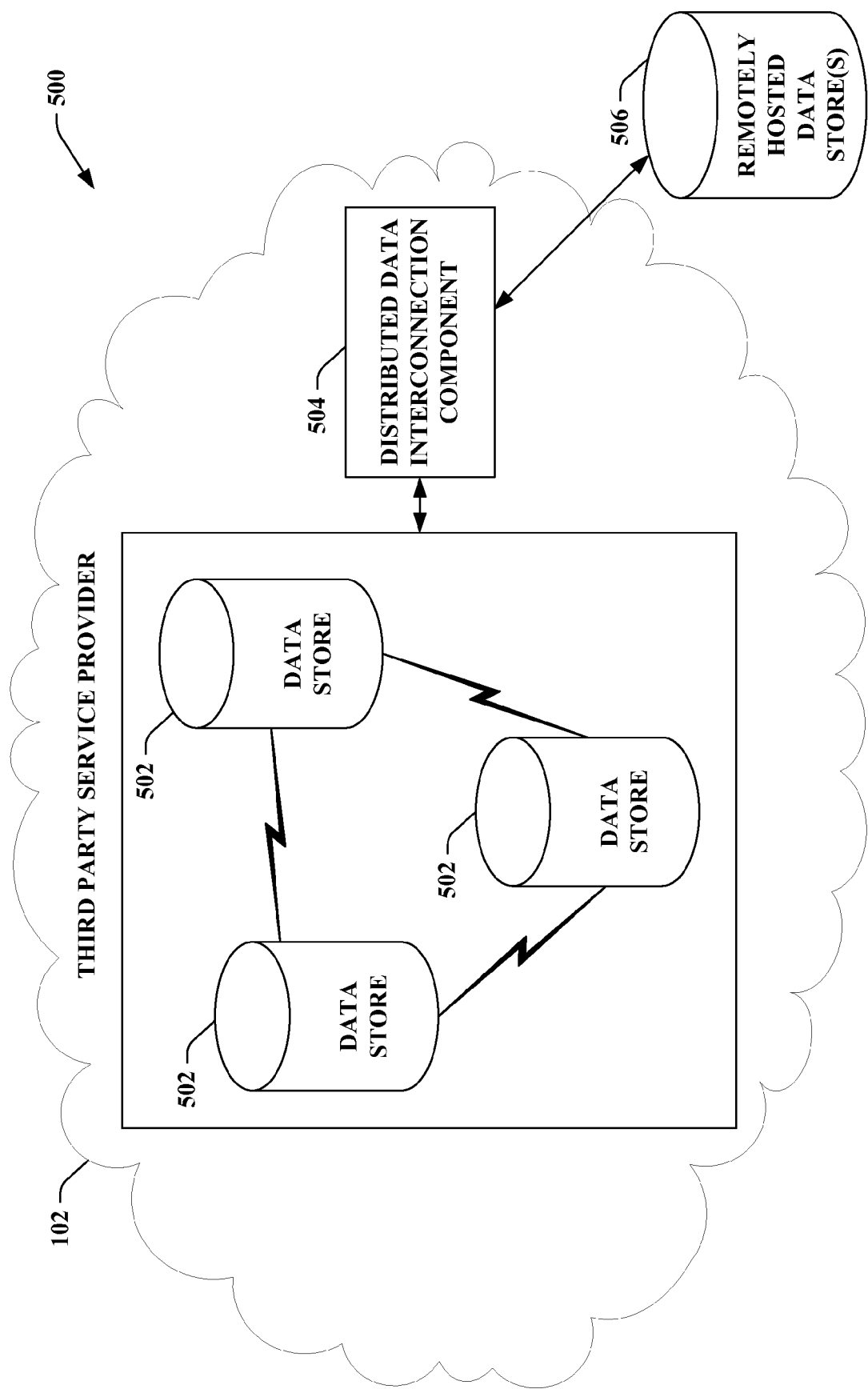
FIG. 5 illustrates a block diagram of an exemplary system that interconnects distributed data retained at various geographic locations.

Turning to FIG. 5, illustrated is a system 500 that interconnects distributed data retained at various geographic locations. The system 500 includes the third party service provider 102 that can include any number of data stores 502 (e.g., the data store(s) 404 of FIG. 4). Further, the third party service provider 102 can include a distributed data interconnection component 504 that can communicate with remotely hosted data store(s) 506 (e.g., data store(s) hosted by disparate off-premises parties).

The data stores 502 can be positioned at any geographic location with respect to one another; for example, a subset of the data stores 502 can be clustered together at a physical location and a disparate subset of the data stores 502 can be positioned at a geographically distinct location. According to an example, the data stores 502 can communicate with each other (and/or any disparate component(s) (not shown) utilized to access data retained in the data stores 502) via wireless connections. For instance, line of sight, non-wired communication lasers (e.g. utilizing digital light processing (DLP) mirrors, . . . ) can be employed to wirelessly communicate between the data stores 502. Additionally or alternatively, wired connections can be utilized between data stores 502. Pursuant to another illustration, the data stores 502 can utilize solid state storage with no moving parts; however, the subject claims are not so limited. In accordance with a further example, the data stores 502 can utilize optimized silicon that addresses the storage architecture associated with the third party service provider 102.

The distributed data interconnection component 504 enables communicating with remotely hosted data store(s) 506. By way of example, a search can be performed over a user's data retained by the data stores 502 and the remotely hosted data store(s) 506. The distributed data interconnection component 504 can allow for seamless interaction such as searching, browsing, editing, and so forth of data stored in the remotely hosted data store(s) 506. Thus, a common repository (e.g., hosted by a single third party service provider, . . . ) for all user data need not be employed.

Figure 6:
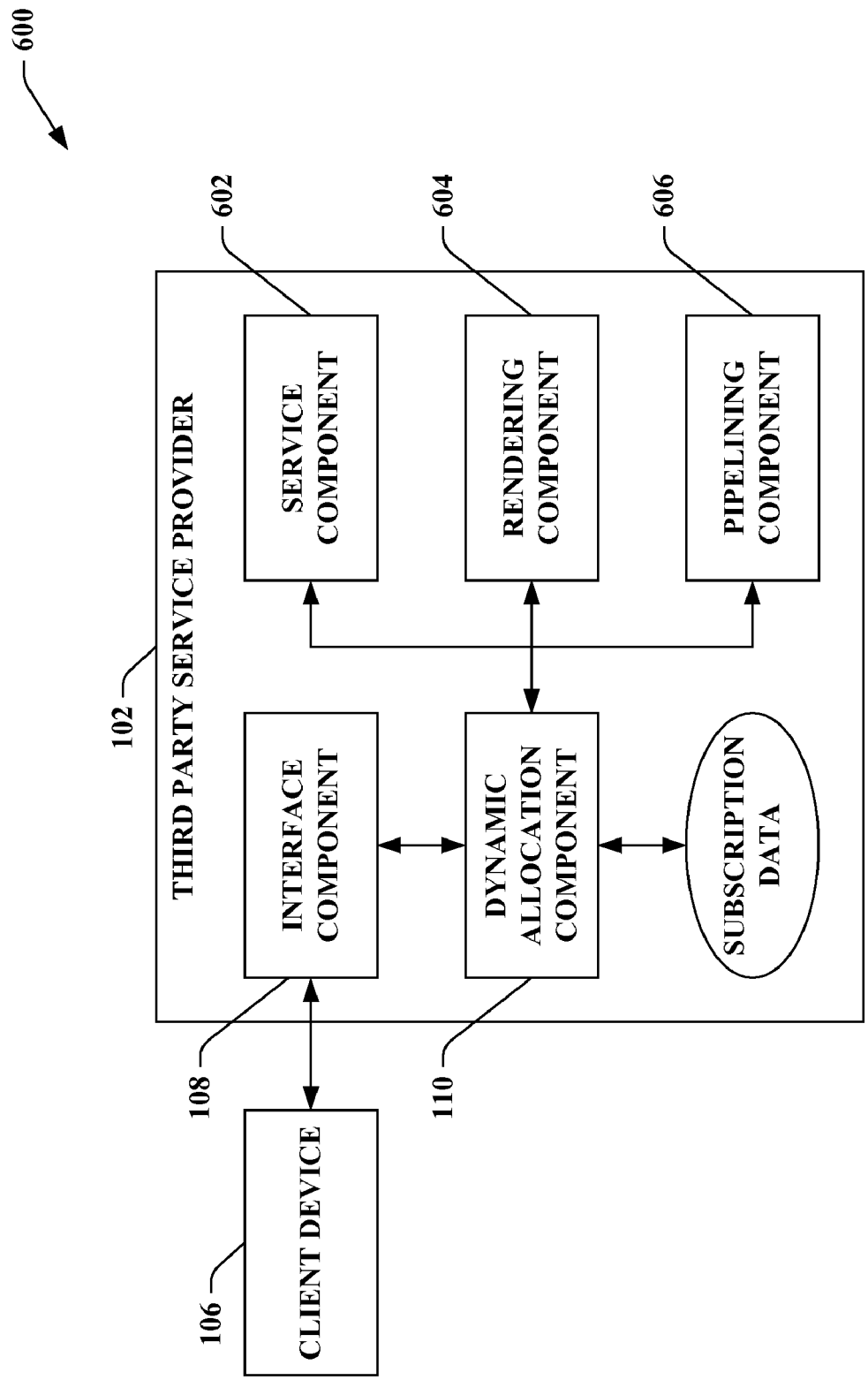
FIG. 6 illustrates a block diagram of an exemplary system that provides various resources supported by a third party service provider.

With reference to FIG. 6, illustrated is a system 600 that provides various resources supported by a third party service provider. The system 600 includes the client device 106 and/or the third party service provider 102, which can further comprise the interface component 108 and the dynamic allocation component 110. Moreover, the third party service provider 102 can additionally include resources (e.g., resources 104 of FIG. 1) such as a service component 602, a rendering component 604, and/or a pipelining component 606.

The service component 602 can effectuate performing service(s) supported by the third party service provider 102. The service component 602 can enable storing, collecting, manipulating, outputting, etc. data. According to an example, the service component 602 can provide a machine translation service that can translate speech to text, a first language to a second language (e.g., English to Chinese, . . . ), and so forth; however, the claimed subject matter is not limited to the aforementioned example.

The rendering component 604 can enable the client device 106 to generate an output that can be yielded to a user. For instance, the rendering component 604 can facilitate displaying a graphical user interface with the client device 106. Moreover, the rendering component 604 can be a real time render farm that can include a plurality of graphics processing units (GPUs). The rendering component 604 can yield a high resolution graphics image that can be transmitted from the third party service provider 102 to the client device 106 via the interface component 108. Further, the rendering component 604 can tailor the rendered user interface based upon characteristics associated with the client device 106 (and/or any disparate client device(s)); accordingly, the rendering component 604 can consider characteristics such as display size and/or processing limitations, and can transfer data to the client device 106 as a function of these characteristics.

Moreover, the pipelining component 606 can enable selectively piping data from the third party service provider 102 to the client device 106. The pipelining component 606 can push subsets of large amounts of data. For instance, the client device 106 can be employed to view an image; upon zooming into a portion of the image, the pipelining component 606 can intelligently pass data to the client device 106 to enable viewing the zoomed portion of the image.

Figure 7:
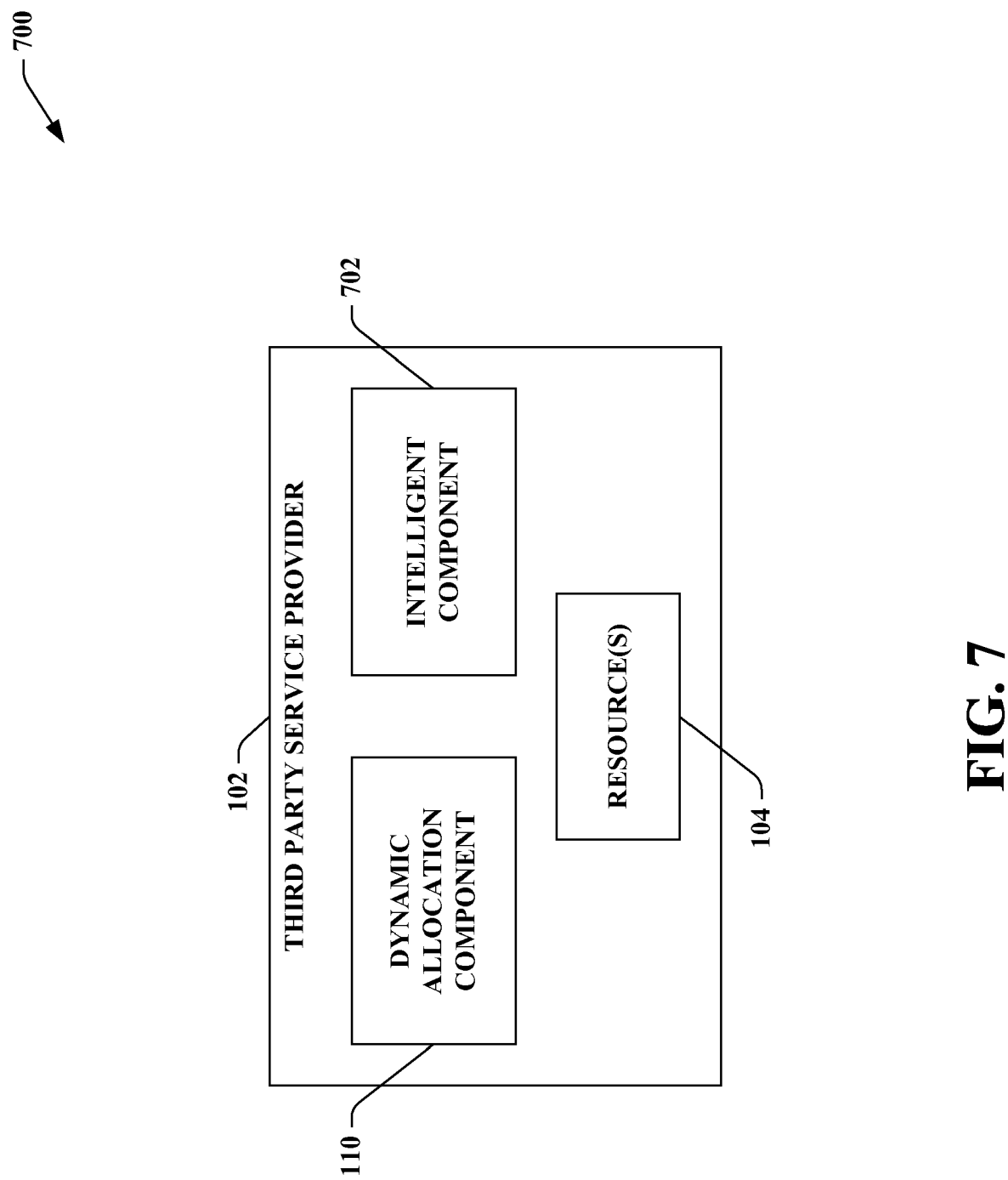
FIG. 7 illustrates a block diagram of an exemplary system that infers a state associated with a device and/or user, and the state can be utilized to dynamically adjust an allocation of resource(s).

Turning to FIG. 7, illustrated is a system 700 that infers a state associated with a device and/or user, and the state can be utilized to dynamically adjust an allocation of resource(s) 104. The system 700 can include the third party service provider 102, resource(s) 104, and the dynamic allocation component 110, each of which can be substantially similar to respective components described above. The system 700 can further include an intelligent component 702. The intelligent component 702 can be utilized by the dynamic allocation component 110 to infer user frustration and/or need. According to an example, the intelligent component 702 can deduce that user frustration is above a threshold level; thus, the dynamic allocation component 110 can modify an allotment of the resource(s) 104 corresponding to the particular user. The intelligent component 702 can effectuate this inference based upon user input, historical data, failures, errors, delays, and so forth. Pursuant to another illustration, the intelligent component 702 can perform inferences related to trends in requests for resource(s) 104. Thus, the intelligent component 702 can determine likelihoods associated with types of resource(s) 104 requested, amounts of resource(s) requested, time of day of requests, source of requests, and so forth. Based upon the inferred trends, the dynamic allocation component 110 can partition resource(s) 104 to various users and/or client devices.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
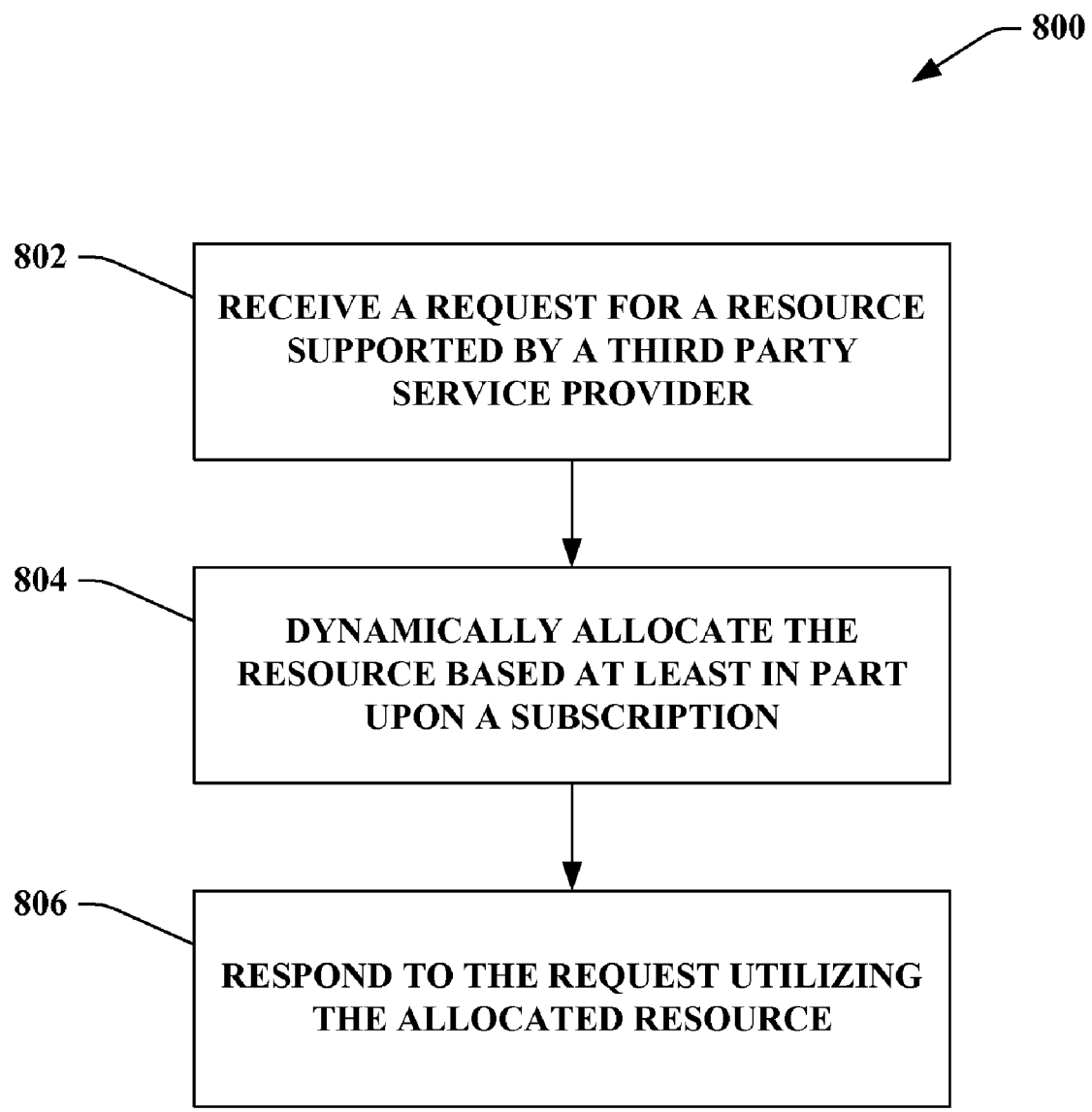
FIG. 8 illustrates an exemplary methodology that facilitates allotting and utilizing resources hosted by a third party service provider.
Figure 9:
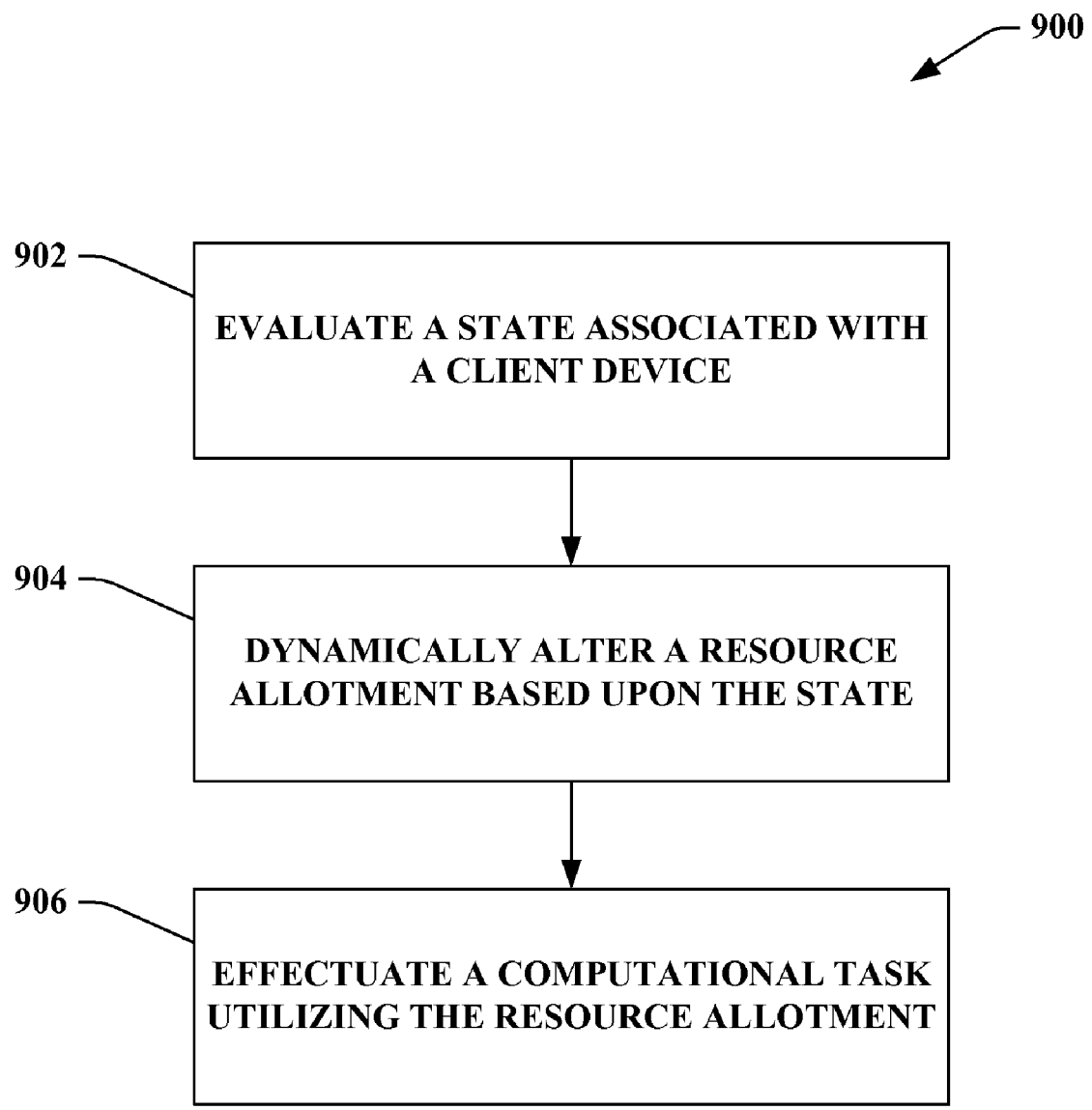
FIG. 9 illustrates an exemplary methodology that facilitates altering resource allocation based upon a state (e.g., associated with user(s) and/or client device(s)).
Figure 10:
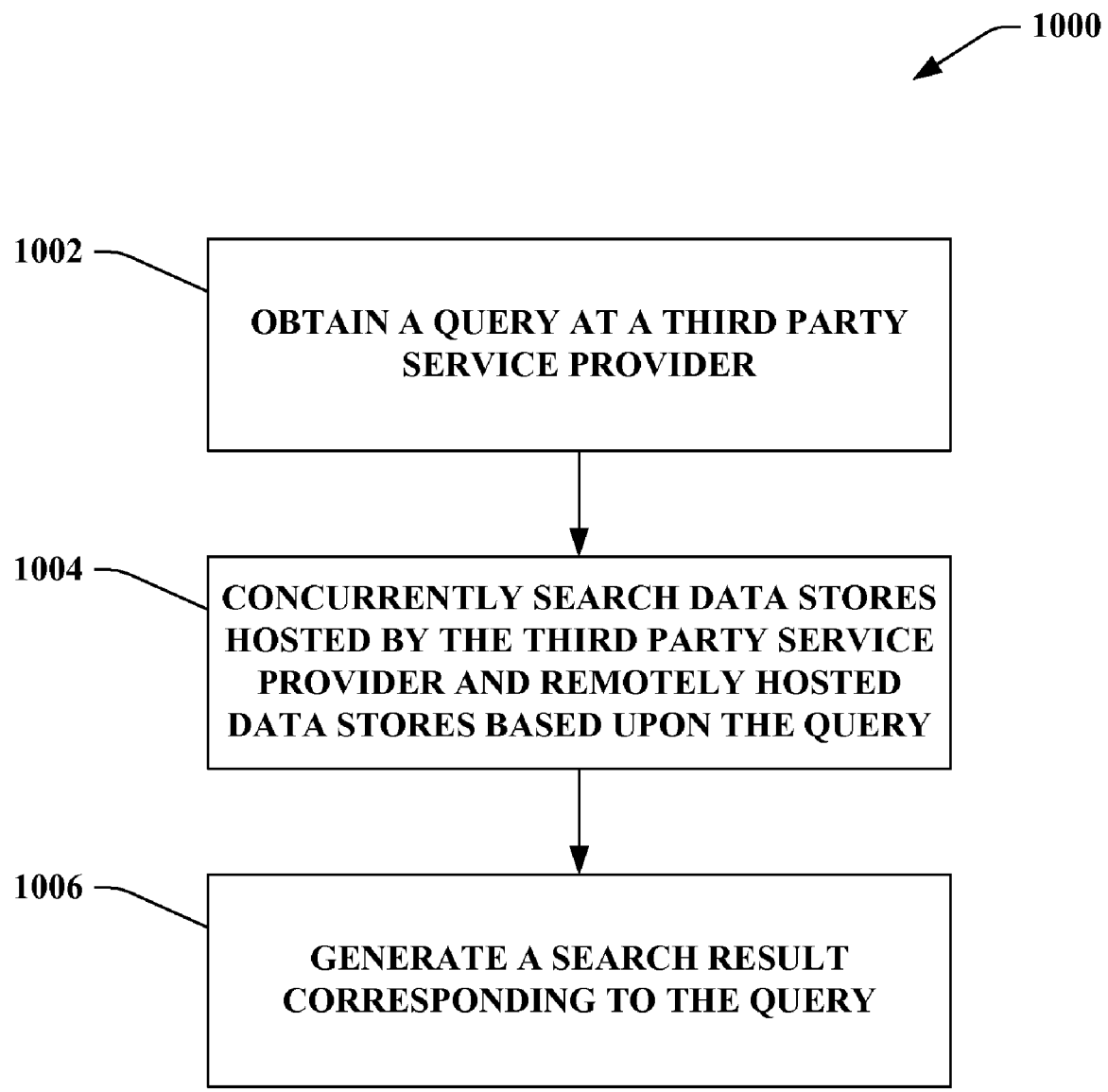
FIG. 10 illustrates an exemplary methodology that facilitates that facilitates searching distributed data retained in allocated memory.

FIGS. 8-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology 800 that facilitates allotting and utilizing resources hosted by a third party service provider. At 802, a request for a resource (and/or a plurality of resources) supported by a third party service provider can be received. The resource can be a hardware and/or software resource. For instance, the resource can enable storing and/or retrieving data, effectuating computational tasks, rendering graphical outputs, routing data, and so forth. Further, the resource can be shared by any number of disparate users and/or remote client devices. At 804, the resource (and/or plurality of resources) can be dynamically allocated based at least in part upon a subscription. For instance, the subscription can provide a minimum allocation of the resource (e.g., minimum allotted bandwidth, CPU cycles, memory, . . . ). Further, resource allocation can vary over time based upon user need, user frustration, number of requests, identity of requesting users, subscriptions associated with requesting users, type of resource requested, time of day, geographic location, cost/benefit analysis, client device capabilities, and the like. At 806, the request can be responded to by utilizing the allocated resources. For instance, the allocated resources can be employed to effectuate a computational task, store data, retrieve data, manipulate data, render a displayed output, transfer data, and so forth.

Turning to FIG. 9, illustrated is a methodology 900 that facilitates altering resource allocation based upon a state (e.g., associated with user(s) and/or client device(s)). At 902, a state associated with a client device (and/or a user) can be evaluated. For example, the state can relate to user frustration, characteristics of the client device (e.g., limitations in processing power, display real estate, bandwidth, memory, . . . ), concurrent requests from the client device, a corporate hierarchy, and/or characteristics of a computational task requested by the client device. At 904, a resource allotment can be dynamically altered based upon the state. According to an illustration, as user frustration increases, the resource allotment can provide an increased share of resources (e.g., more CPU cycles, increased bandwidth, additional caching, . . . ). At 906, a computational task can be effectuated utilizing the resource allotment.

Turning to FIG. 10, illustrated is a methodology 1000 that facilitates searching distributed data retained in allocated memory. At 1002, a query can be obtained at a third party service provider. The query can be, for instance, associated with a search request. At 1004, data stores hosted by the third party service provider and remotely hosted data stores can be concurrently searched based upon the query. For instance, searches associated with the data stores hosted by the third party service provider can be effectuated by communicating between the data stores via wireless connections. Further, searching can be effectuated over allocated portions of the data stores and/or remotely hosted data stores (e.g., allotted to a user, shared with the user, . . . ). Moreover, searching can be performed without migrating data from the remotely hosted data stores to the data stores associated with the third party service provider. At 1006, a search result corresponding to the query can be generated. The generated search result can be returned to a client device that provided the query, for instance.

Figure 11:
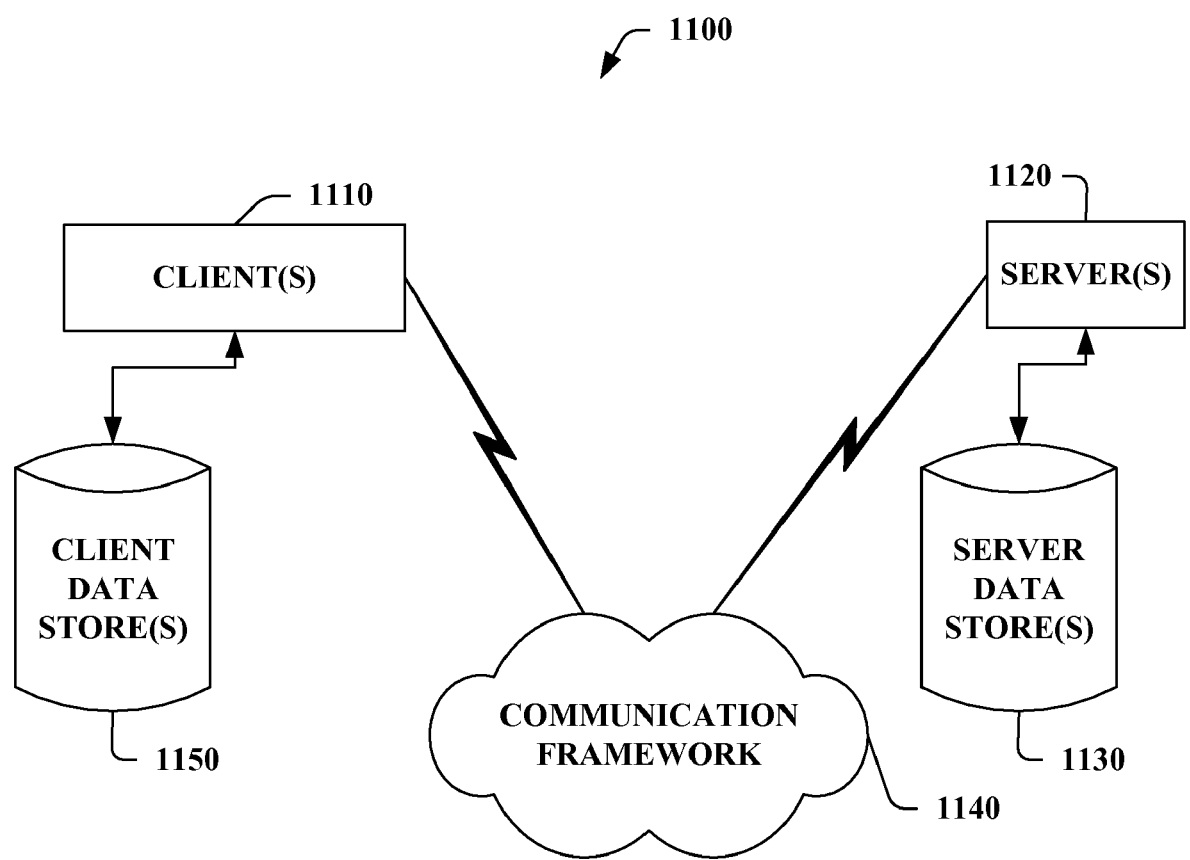
FIG. 11 illustrates an exemplary networking environment, wherein the novel aspects of the claimed subject matter can be employed.
Figure 12:
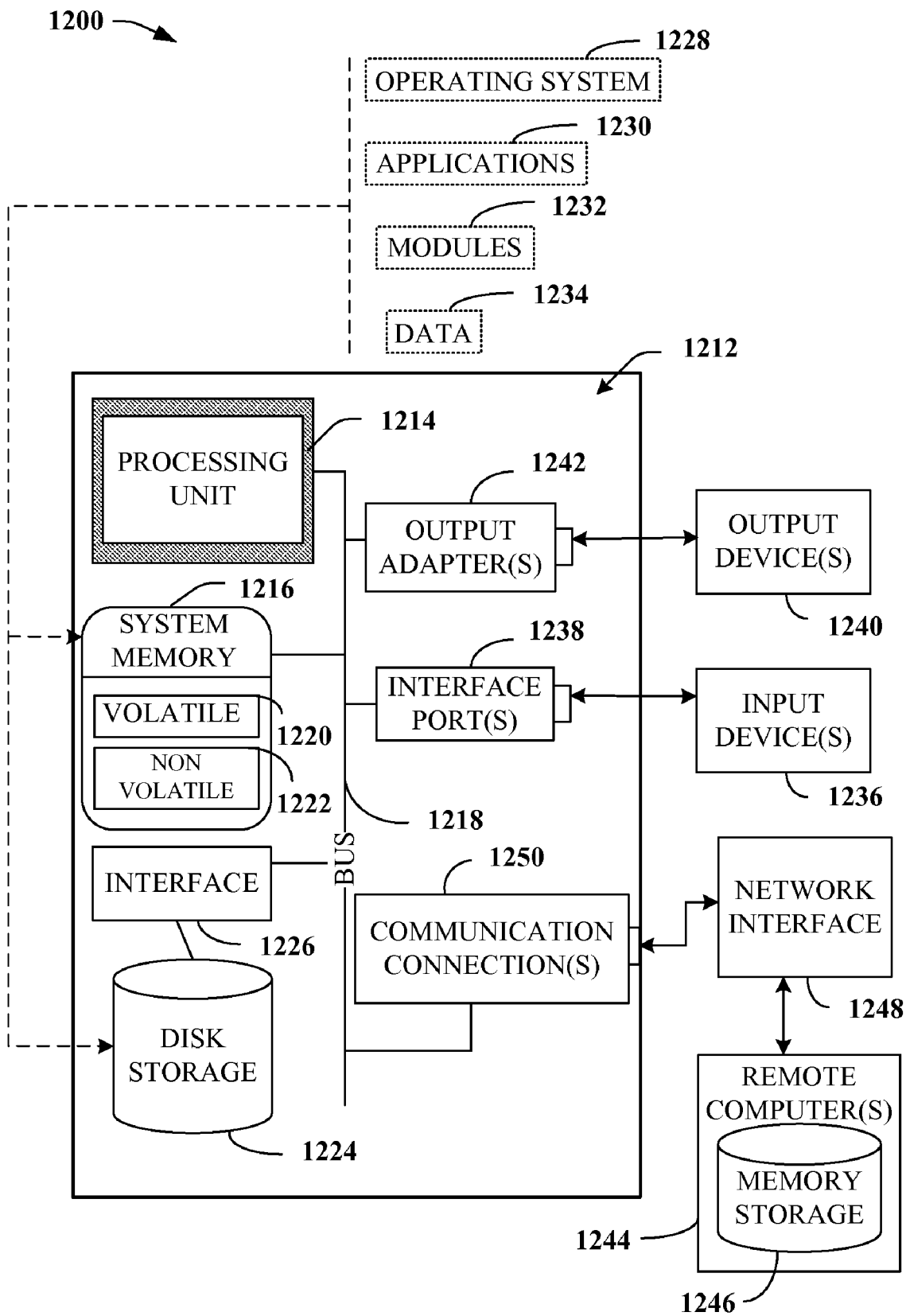
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For instance, FIGS. 11-12 set forth a suitable computing environment that can be employed in connection with dynamically allocating resource(s) supported by a third party service provider to client device(s). While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates adjusting hardware resource utilization and allocation, the system comprising:
    a processor;
    an interface component that receives an input from a client device;
    a user state evaluator to determine a frustration level of a user of the client device with services provided by a third party service provider, the frustration level of the user being based on at least one of delays, failures, and errors with respect to a request to perform a computational task at the third party service provider, based on a number of repeated activations of an input device before receiving a response to the request, and based on physical movements and facial expressions of the user of the client device;
    a dynamic allocation component that dynamically apportions hardware resources supported by the third party service provider to process and respond to the frustration level of the user of the client device by increasing hardware resources provided to the client device.

2. The system of claim 1, the dynamic allocation component allocates the hardware resources based on one or more of a subscription level, an authorization level, availability of the hardware resources, capabilities of the client device, and characteristics of computational tasks.

3. The system of claim 1, the hardware resources comprise one or more of central processing unit (CPU) cycles, data storage, redundancy, alternative communication paths, and bandwidth.

4. The system of claim 1, the third party service provider enables at least one of adding, removing, testing, and replacing a subset of the hardware resources while continuing to service an additional input.

5. The system of claim 4, the additional input being at least one of a request, data, and an executable program.

6. The system of claim 1, the dynamic allocation component apportions the hardware resources when the client device at least one of anonymously utilizes the third party service provider, employs a pay-as-you-go plan, and obtains advertising content from the third party service provider.

7. The system of claim 1, wherein the user state evaluator determines a state associated with the client device, the state being utilized by the dynamic allocation component to tailor the apportioned hardware resources.

8. The system of claim 1, further comprising an enhancement component that at least one of increases an amount of the apportioned hardware resources and alters a type associated with the apportioned hardware resources based upon an explicit user input.

9. The system of claim 1, further comprising an auction component that identifies unused hardware resources apportioned to a first user according to a subscription of the first user, that determines that a second user needs additional hardware resources, that determines a fair market value of the hardware resources associated with a trade of hardware resources between the first user and the second user, and that automatically brokers the trade of hardware resources between the first user and the second user.

10. The system of claim 1, further comprising a load balancing component that optimizes utilization of the hardware resources to increase capacity associated with the third party service provider based upon one or more of a time of day, a geographic location, and variations in pricing.

11. The system of claim 1, further comprising a management component that facilitates administering data retained in an allocated portion of one or more data stores, the management component supports organizing, annotating, and referencing content without making the content local to the client device.

12. The system of claim 1, further comprising a versioning component that at least one of tracks versions of data and creates new versions of data linked to previous versions upon saving data.

13. The system of claim 1, further comprising a distributed data interconnection component that enables seamless interaction with remotely hosted data stores.

14. The system of claim 1, further comprising a pipelining component that selectively pipes subsets of large datasets from the third party service provider to the client device.

15. A method that facilitates allotting hardware resources hosted by a third party service provider, the method comprising:
    receiving, by a third party service provider server, a request to temporarily increase an allocation of hardware resources allotted to a client device, wherein the allocation of hardware resources allotted to the client device is based at least in part on a subscription, wherein the subscription includes a preset number of opportunities to dynamically increase the allocation of hardware resources allotted to the client device, and wherein the hardware resources are supported by the third party service provider;

varying the allocation of hardware resources to the client device, by the third party service provider server, based on user frustration, the user frustration being based on at least one of delays, failures, and errors with respect to the request, based on a number of repeated activations of an input device before a response to the request is provided, and based on physical movements and facial expressions of the user of the client device;

responding to the request, at the third party service provider server, by increasing the allocation of hardware resources allotted to the client device;

applying, by the third party service provider server, monetary charges in addition to costs of the subscription in response to the request; and receiving, by the third party service provider server, an additional request to alter a type of hardware resources allotted to the client device.

16. The method of claim 15, the subscription provides a minimum allocation of at least one particular hardware resource.

17. The method of claim 15, further comprising:
evaluating, by the third party service provider server, a state associated with the client device; and
dynamically altering the allocation of hardware resources based upon the state, by the third party service provider server.

18. The method of claim 15, wherein varying the allocation of hardware resources to the client device, by the third party service provider server, is based on one or more of an authorization level, availability of the hardware resources, capabilities of the client device, and characteristics of computational tasks.

19. The method of claim 15, further comprising searching, by the third party service provider server, distributed data retained in allocated memory by concurrently searching data stores hosted by the third party service provider and remotely hosted data stores.

20. A system that facilitates altering an allocation of hardware resources hosted by a third party service provider, the system comprising:
a processor;
means for receiving a request to perform a computational task at the third party service provider from a client device;
means for determining at least one of delays, failures, and errors with respect to the request;
means for determining a frustration level of a user of the client device based on the at least one of delays, failures, and errors with respect to the request, based on a number of repeated activations of an input device before receiving a response to the request, and based on physical movements and facial expressions of the user of the client device;
means for increasing hardware resources allocated to the client device to perform the computational task based on the frustration level of the user of the client device;
means for decreasing the hardware resources allocated to the client device to perform the computational task when the frustration level of the user of the client device decreases; and
means for effectuating the computational task at the third party service provider by utilizing the hardware resources allocated to the client device.

* * * * *